UNITED STATES PATENT OFFICE.

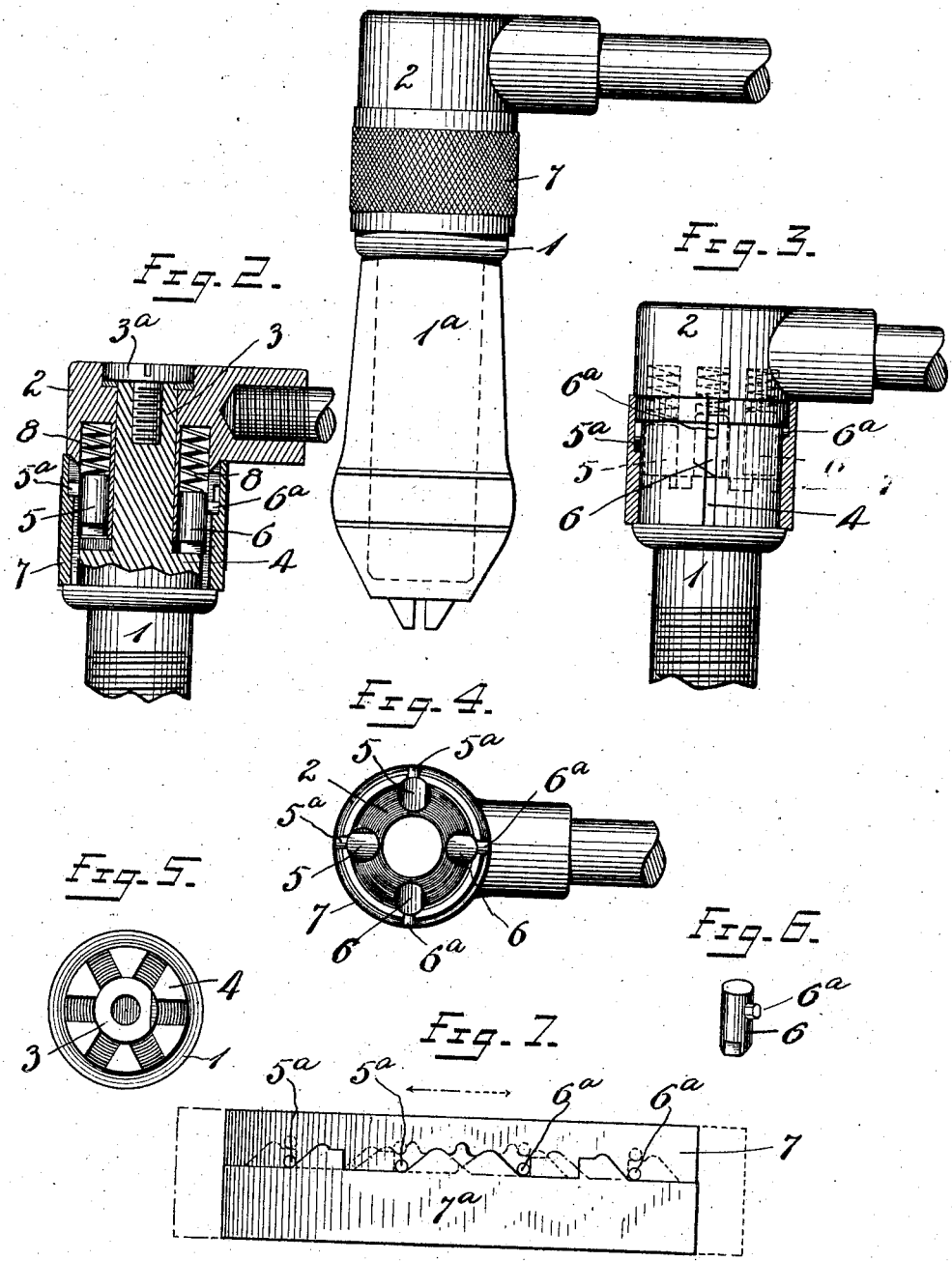

HARRIS J. COOK, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

RATCHET MECHANISM.

No. 850,566.     Specification of Letters Patent.     Patented April 16, 1907.

Application filed February 24, 1905. Serial No. 247,207.

*To all whom it may concern:*

Be it known that I, HARRIS J. COOK, a citizen of the United States, residing at New Britain, county of Hartford, and State of Connecticut, have invented certain new and useful Improvements in Ratchet Mechanisms, of which the following is a full, clear, and exact description.

My invention relates to improvements in ratchet mechanism for tools—for example, bit-braces.

Among the objects of the invention is to provide simple and effective mechanism for interlocking the driving and the driven parts or for permitting said parts to turn freely in either direction, but be coupled in opposition.

In the drawings, Figure 1 is a side elevation of my invention as it would appear applied to a portion of a bit-brace. Fig. 2 is a vertical section showing certain parts in a position opposite to that shown in dotted lines, Fig. 2. Fig. 3 is a view similar to Fig. 1, partly in section, showing the internal parts in dotted outline. Fig. 4 is a view of the under side of the driving part, the driven part being removed. Fig. 5 is a plan view of the driven part, the driving part being removed. Fig. 6 is a perspective view of the detail of construction. Fig. 7 is a development view of the operating-cam.

1 is the driven part, which may be equipped with any suitable tool-holding device or chuck, conventionally illustrated at 1<sup>a</sup>.

2 is the driving part.

3 is a spindle or shaft carried by the driven part and projecting through a central bore in the hub of the driving part 2. By this means a long firm bearing is afforded, effectively preventing bending and twisting strains.

3<sup>a</sup> is a screw arranged to take into the spindle 3 and overstand a portion of the driving part 2 to hold said parts together.

4 is a crown-ratchet upon the driven part.

5 5 and 6 6 are pawls carried in suitable guideways in the hub of the driving part 2 and arranged in the manner and for the unique purpose hereinafter more fully set forth. As shown, each of the pawls 5 5 is provided with a toothed end, said tooth having one abrupt shoulder and one inclined shoulder, the abrupt shoulders facing in the same direction. The teeth 6 6 are similarly formed, although the abrupt face of each of these teeth face in an opposite direction to the abrupt faces of the teeth on pawls 5 5. The end of the hub of the driving part 2 is smooth and flat and so, also, is the end of the crown-ratchet. Hence when the parts are assembled the thrust of the driving part is effectively taken up by the driven part.

Referring to Fig. 5, it will be seen that the number of teeth therein does not correspond with the number of pawls 5 6. As shown, there are six teeth in the crown-ratchet, whereas there are four pawls arranged to cooperate therewith. The angular spacing of the operative faces of the pawls of one set relative to the common axis of the driving and driven parts is different from the angular spacing of the similarly-faced shoulders of the ratchet-teeth. In this case the angle between the operative faces of the pawls of one set is substantially ninety degrees, whereas the angle between the similarly-disposed shoulders of the ratchet-teeth is substantially sixty degrees. If, for example, the teeth on the diametrically opposite pawls 5 6 had their abrupt faces facing in the same way and arranged to operate to drive the driven part in the same direction, it is plain that these pawls would simultaneously engage with teeth on the crown-ratchet, and in case an intermittent driving action were desired it would be necessary to swing back the driving part at least one-sixth of a revolution before said pawls would engage another tooth. By the arrangement which I have devised it is necessary to swing back the driving part only one-twelfth of a revolution, even though there are only six teeth employed in the crown-ratchet. This is due to the fact that the pawls 5 5 are so placed relatively to each other that when one of these pawls is engaging with one of the teeth in the crown-ratchet the other one is resting upon the head of the ratchet half-way between the positions where it would ordinarily engage a tooth. The same is true of the pawls 6 6. The result is that as little as one-twelfth of a turn in a backward direction of the driving part will cause intermittent engagement with the driven part through one or the other of the two pawls 5 5 or 6 6. One substantial benefit arising from this unique arrangement is that it permits the manufacturer to make the teeth in the crown-ratchet 4 of substantial width and correspondingly great strength.

Each of the pawls 5 5 and 6 6 is preferably round and is mounted in a bearing of corresponding cross-sectional outline in the hub of the driving part. The projections 5ª 5ª and 6ª 6ª, standing in the vertical slots in the side wall of said hub, prevent the pawls from turning in their respective sockets. These projections also rest upon a cam 7ª, carried by the operating-sleeve 7. The cam 7ª has high points and low points so arranged that they will operate simultaneously upon one or the other set of pawls, or said cam may be moved so that said high points will engage none of said pawls, in which event one pawl 5 of one set and one pawl 6 of the other set will simultaneously engage teeth of the crown-ratchet and interlock the parts.

Merely for the sake of illustration of how the cams will operate the pawls I have shown the development view Fig. 7. If the crown-ratchet were not present, but the parts were as shown in Figs. 4 and 7, it would be seen that all of the pawls 5 and 6 are free to descend, so that the projections 5ª and 6ª will rest upon the lowest parts of the cam 7ª. If the cam is moved in one direction—for example, to the right, as illustrated in dotted lines in Fig. 7—the two pawls 6 6 will be lifted so that they cannot engage with the crown-ratchet. If the cam is moved to the opposite extreme position, (indicated in dotted lines, Fig. 7,) the pawls 6 will descend, while the pawls 5 will be lifted. By this arrangement an intermittent right or left hand clutching action will be afforded. Of course in practice, when the crown-ratchet is in place and the cam 7ª stands in the position indicated in solid lines, Fig. 7, relatively to the projections 5ª and 6ª, the latter would not all stand in the position indicated in said solid lines, because one pawl of each set would rest upon the top of the crown-ratchet, while the other pawl of each set would engage in a notch in the crown-ratchet. With this explanation Fig. 7 will be understood.

In the preferred form suitable spring mechanism is provided to cause the pawls to move toward the crown-ratchet. In the drawings 8 8 are springs provided for each of the pawls. These springs are located in the pawl-sockets back of each pawl. It is obvious that one particular feature of the invention resides in providing the apparatus with a set of pawls, of two or more, so spaced relatively to the spacing of the teeth in the crown-ratchet that one pawl will be in engagement in a notch while another pawl of the same set will rest upon the top of the crown-ratchet.

What I claim is—

In a ratchet mechanism for tools, a driving part, a driven part rotatively connected to said driving part, a crown-ratchet upon one of said parts having six teeth with two oppositely-disposed faces to each tooth, four pawls carried by the other part and arranged at equal intervals around its axis, two adjacent pawls having shoulders facing in one direction, and the other two adjacent pawls having shoulders facing in the other direction, and means for holding both pawls of either set out of engagement with the ratchet.

HARRIS J. COOK.

Witnesses:
H. S. WALTER,
W. J. WORAM.